(12) United States Patent
Franklin

(10) Patent No.: US 12,055,847 B2
(45) Date of Patent: Aug. 6, 2024

(54) DUAL SIDED DISPLAY

(71) Applicant: Cole Franklin, San Clemente, CA (US)

(72) Inventor: Cole Franklin, San Clemente, CA (US)

( * ) Notice: Subject to any disclaimer, the term of this patent is extended or adjusted under 35 U.S.C. 154(b) by 180 days.

(21) Appl. No.: 18/050,447

(22) Filed: Oct. 27, 2022

(65) Prior Publication Data

US 2023/0141213 A1    May 11, 2023

Related U.S. Application Data

(60) Provisional application No. 63/276,466, filed on Nov. 5, 2021.

(51) Int. Cl.
*G03B 21/62*    (2014.01)
*G03B 21/10*    (2006.01)

(52) U.S. Cl.
CPC ............. *G03B 21/62* (2013.01); *G03B 21/10* (2013.01)

(58) Field of Classification Search
CPC ................ G03B 21/62–625; G03B 21/10
See application file for complete search history.

(56) References Cited

U.S. PATENT DOCUMENTS

| | | | | |
|---|---|---|---|---|
| 7,495,829 | B2 * | 2/2009 | Peterson | G03B 21/60 359/459 |
| 7,835,078 | B2 * | 11/2010 | Ichikawa | G03B 21/60 359/449 |
| 11,927,878 | B2 * | 3/2024 | Tong | B05B 1/14 |
| 2020/0093263 | A1 * | 3/2020 | Lindegaard | F16M 11/043 |

FOREIGN PATENT DOCUMENTS

CN           107315314 A  * 11/2017 ............. G03B 21/62

* cited by examiner

*Primary Examiner* — Leon W Rhodes, Jr.
(74) *Attorney, Agent, or Firm* — Clement Cheng

(57) ABSTRACT

A dual sided display includes a display projector. The display projector includes a lamp and a display projector image. The display projector image has pixels and the pixels produce light as light rays. The display includes a display panel that has an upper edge, a lower edge, a left edge and a right edge. The display panel is formed of a substrate that is translucent or transparent. A display panel first viewing surface is formed on the first side of the display panel. A display panel second viewing surface is formed on the second side of the display panel. The wherein the display panel first viewing surface is parallel to and opposing the display panel second viewing surface. The display panel has a thickness. A displayed image is displayed on the display panel first viewing surface and the display panel second viewing surface simultaneously.

7 Claims, 4 Drawing Sheets

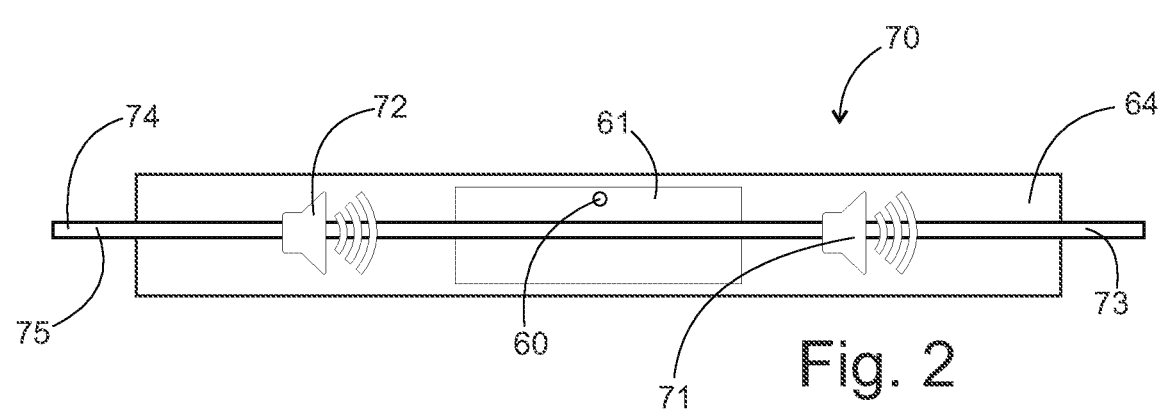
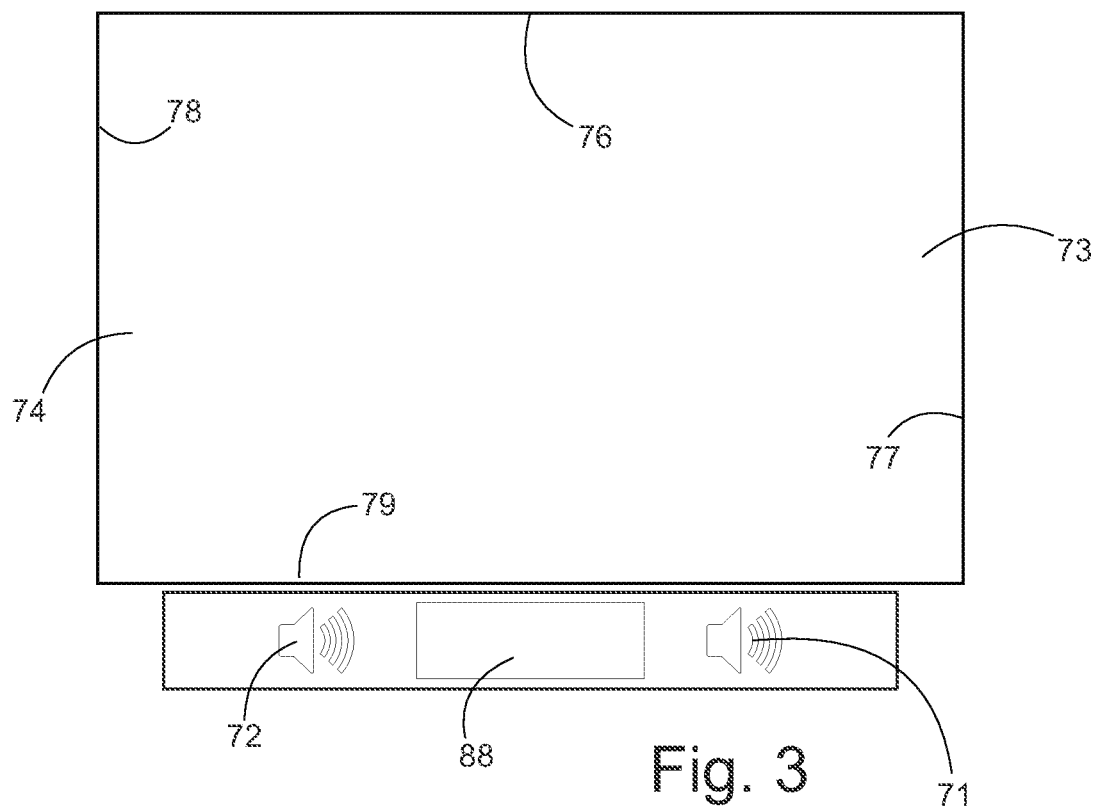

DUAL SIDED DISPLAY

The present application claims priority from U.S. provisional application 63/276,466 filed Nov. 5, 2021 entitled Dual Sided Display by same inventor Cole Franklin, the disclosure of which is incorporated herein by reference.

FIELD OF THE INVENTION

The present invention is in the field of digital displays.

DISCUSSION OF RELATED ART

A variety of different transparent and dual sided displays have a direct or projector system.

SUMMARY OF THE INVENTION

Clear displays are used today mainly as name signs or on trophy but there will be a day when movies can be watched on a transparent display. There are some companies developing transparent displays based on transparent organic LEDs. A competitive high technology effect utilizes advancement in projector technology with much less manufacturing complexity. The manufacturing process for this technology has a low carbon footprint compared to what is currently on market. This novel display can disrupt the viewing market as people enjoy together images, movies, and projects in a more collaborative and futuristic way. Modern display technology and clarity can be achieved on glassy and transparent media using a d) short throw projector when a) combining photonic particles and b) light diffusion creates a standing wave that captures visible light. This combination we have shown to retain and refract nearly 80% of light projected at it and can be achieved with various media including glassy, clear epoxy, clear silicone and other transparent or translucent material. Additionally, adding c) angular tapering to the pocket where the photonics particle sits improves the daytime brightness minimizing the ambient lights effect on the image.

Utilizing advanced texturing with layering in photonic particles on various substrates can create pixels that can collect and then retransmit or re-broadcast red, green, and blue light when a projector emits its image onto the substrate. Texturing controlled visible wavelength reflectors in glass with optical wells where the wells have angled walls from 30 to 90 degrees depending on level of ambient light that are between 1-30 ums with photonics particles in the range 300 to 800 nm would capture any image projected to it and have the desired effect.

The substrate forms pixels through forming a matted finish that scatters and diffuses the light at the surface combined with photonics particles in these pixelated pits from the matting process then captures the light into the pixel by forming a standing wave with the photonics particle that acts like the antenna for the pit forming a pixel. There is no applied power, only an applied and projected image from a projection lamp preferably in the form of a short throw projector as this allows for all the components to be housed in the same box under or along the side of the substrate being illuminated.

A dual sided display includes a display projector. The display projector includes a lamp and a display projector image. The display projector image has pixels and the pixels produce light as light rays. The display includes a display panel that has an upper edge, a lower edge, a left edge and a right edge. The display panel is formed of a substrate that is translucent or transparent. A display panel first viewing surface is formed on the first side of the display panel. A display panel second viewing surface is formed on the second side of the display panel. The wherein the display panel first viewing surface is parallel to and opposing the display panel second viewing surface. The display panel has a thickness. A displayed image is displayed on the display panel first viewing surface and the display panel second viewing surface simultaneously. The display panel is oriented to the display projector such that the light rays are projected at an acute angle of less than 45 degrees onto at least a portion of the display panel.

Optionally, the display projector is preferably mounted to the base. The display panel is mounted to the base. A first retainer can be mounted to the base and also be mounted to the display panel. The upper edge, the lower edge, the left edge, and the right edge are preferably frameless. The display panel preferably has a frameless upper edge, a frameless lower edge, a frameless right edge, and a frameless left edge.

The light rays are a group of light rays and include an upper light ray, a middle light ray, and a lower light ray. The upper light ray contacts the substrate and reflects from an upper tip into an upper pocket. The middle light ray contacts the substrate and reflects from a middle tip into a middle pocket. The lower light ray contacts the substrate and reflects from a lower tip into a lower pocket. The upper pocket produces an upper pixel of the displayed image. The middle pocket produces a middle pixel of the displayed image. The lower pocket produces a lower pixel of the displayed image. The display panel has a display panel surface roughness. The display panel has an upper region and a lower region profile. The display panel has an upper angle that is less than 30 degrees, and a lower angle that is approximately 45 degrees.

BRIEF DESCRIPTION OF THE DRAWINGS

FIG. 2 is a top view diagram of the present invention.

FIG. 3 is a front view diagram of the present invention.

The following call out list of elements can be a useful guide in referencing the element numbers of the drawings.
20 Displayed Pixels
21 Upper Pixel
22 Middle Pixel
23 Lower Pixel
24 Display Panel Surface Roughness
25 Panel Thickness
26 Pixel Thickness
30 Concave Pockets
31 Upper Pocket
32 Middle Pocket
33 Lower Pocket
34 Upper Region Profile
35 Lower Region Profile
41 Upper Tip
42 Middle Tip
43 Lower Tip
48 Upper Middle Tip
50 Discrete Rays 51 Upper Light Ray
52 Middle Light Ray
53 Lower Light Ray
60 Lamp
61 LCD
62 Pixel On LCD
63 Substrate
64 Base
65 Frame
66 First Retainer
67 First Retainer
68 First Retainer Anchor
69 Second Retainer Anchor
70 Speakers
71 First Speaker
72 Second Speaker
73 Display Panel
74 Display Panel First Viewing Surface
75 Display Panel Second Viewing Surface
76 Frameless Upper Edge
77 Frameless Right Edge
78 Frameless Left Edge
79 Frameless Left Edge
81 Lower Angle
82 Upper Angle
83 Display Projector Image
88 Display Projector
125 Filler Second Substrate

DETAILED DESCRIPTION OF THE PREFERRED EMBODIMENT

As seen from a top view of the present invention, the present invention has a base formed as a stand retaining a transparent substrate that does not have a frame. The transparent substrate can be a fresnel lens for example. The stand is mounted with a short throw projector underneath the stand. A pair of speakers can be integrated to the stand. The transparent substrate is aligned to a midline of the stand.

As seen from a front view of the present invention, the transparent substrate is generally rectangular and supported by the stand.

As seen in a perspective view of the present invention, the 50 inch stand supports a transparent substrate that when lit can be seen from both sides.

As seen from a side view of the present invention, light rebounds within a pocketed portion of the photon particle. Light is diffused through the pocket. The pocket can be formed in a regular pattern with the diffusion from the pocket at an angle that captures light and reflects it into the substrate, where each pocket is formed as a prism tip.

Unlike a regular fresnel lens where light is being focused from an angled path to a straight path through the lens, the present invention has the light focused from an angled path to a pocket, or a space between the prism tips were it reflects multiple times in all directions to allow double-sided viewing.

Figure 1:
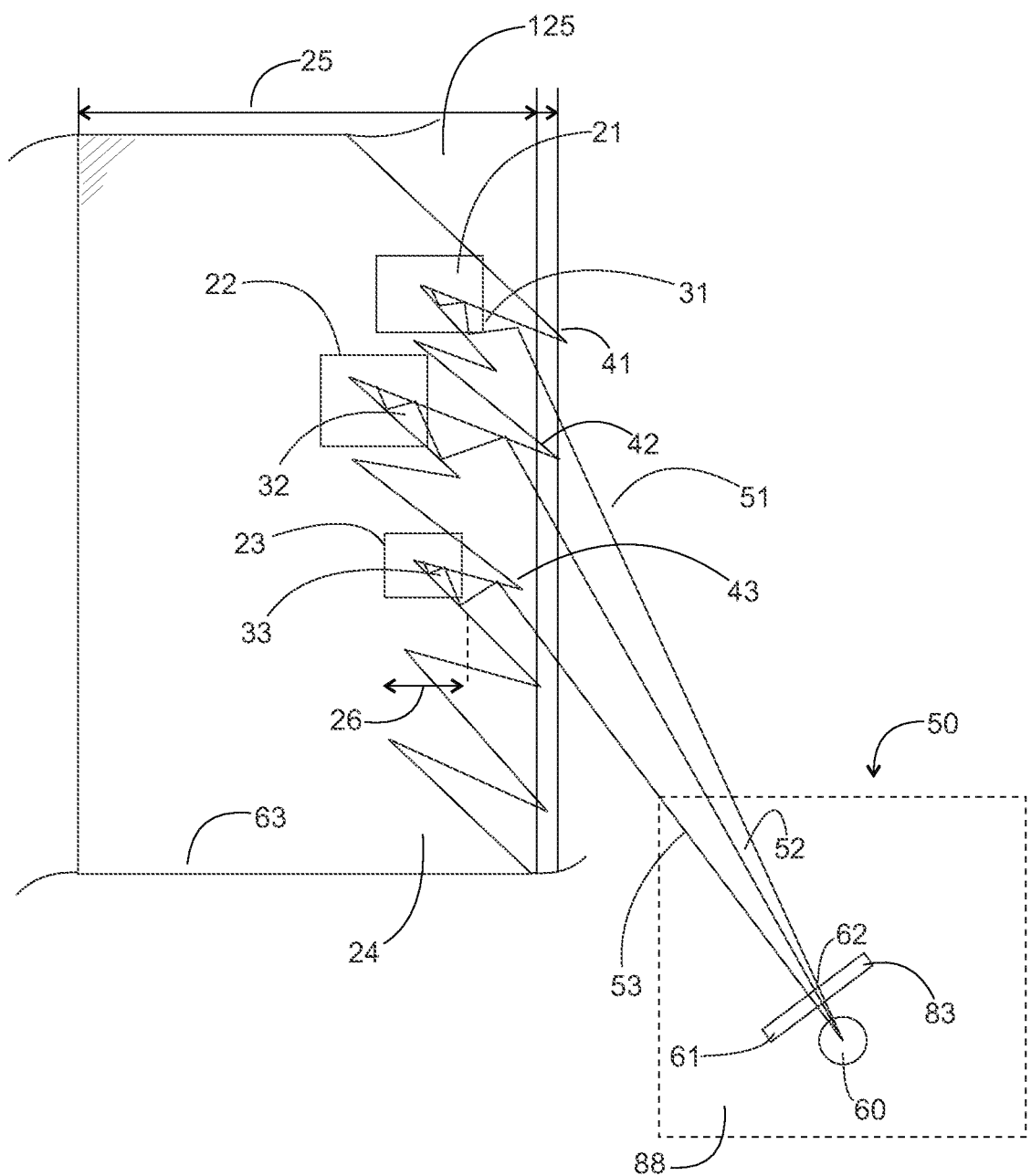
FIG. 1 is a cross-sectional diagram of the present invention.

As seen in FIG. 1 the substrate has an upper tip, a middle tip, and a lower tip. The lamp passes through an LCD display that passes through a focusing lens and lands on the substrate.

The upper light ray bounces off the upper pocket and rebounds within an upper pocket underneath the upper tip. The rebounding length decreases with each successive rebound. This generates an upper pixel display. The lamp is configured with discrete pixel display matching the pocket locations. As the light rebounds within the pocket, the translucent material around the pocket creates one pixel of display. The upper pixel corresponds to an upper light ray pixel on the LCD display.

Similarly, the middle tip receives a middle light ray which rebounds within a middle pocket and generates a middle pixel of display. The lamp configures the middle light ray so that it is aimed toward the middle pocket to generate the middle pocket display. The lamp can have a specific location calibrated to the middle pixel such as by a feedback focus mechanism where the lamp is connected to a processor and the processor views the display and automatically adjusts it for clarity by individually calibrating each light ray with a pixel on an LCD display that matches each pocket. The middle pixel corresponds to a middle light ray pixel on the LCD display.

Likewise, the lower tip captures a lower light ray which rebounds with successively shorter rebound length inside a lower pocket. The lower pocket generates a lower pixel of display based on the lower light ray. The lower light ray corresponds to a lower light ray pixel on the LCD display.

Accordingly, the tips are overhanging each other and overhanging the pockets underneath the tips like Christmas tree branches that overhang ornaments. As the pixels are illuminated on the substrate, they can be seen from both sides unlike a regular back projection television with a fresnel lens that is only designed to be seen from the front so has minimal backscattering.

The substrate can be a transparent glass board with matting on the side that collects the projected image. Optionally, an acrylic substrate can be used without matting where the acrylic has fiberglass particles which are poured over the acrylic substrate. The pockets can be relatively large such as 1 mm, or very small on the order of micrometers. For example, a clear resin can be applied over the substrate and the fiberglass particles suspended in the clear resin can be oriented randomly such that they provide pockets of clear area between them so as to allow a partially refractive media. The fiberglass particles can also create optical overhangs.

As seen in FIG. 1, the panel has a panel thickness 25 that has displayed pixels 20 on it. The displayed pixels can be displayed with or without a filler second substrate 25. The substrate 63 of the panel has a display panel surface roughness 24 which can be smoothed by adding a filler second substrate 25. Alternatively, the display panel surface roughness 24 has a plurality of concave pockets 30 that allow the light to be captured and retransmitted within each pocket. Each pocket can collect light and form a pixel. The pixels do not necessarily align to an array or regular structure. For example, though concave pockets 30 can include an upper pocket 31, a middle pocket 32, and a lower pocket 33. The upper pocket 31 has an upper tip 41, the middle pocket 32 has middle tip 42, and the lower pocket 33 has a lower tip 43.

The tips of each pocket reflect the light into the cavity of each pocket. The light bounces around inside of each pocket and ruminate each pixel. The pixel therefore has a pixel thickness 26 where the light is captured.

Discrete light rays 50 can be projected from a display projector 88 which can be a digital display projector having a display projector image 83. The display projector image 83 is illuminated through a lamp 60. The lamp 60 passes through an LCD 61 which has a display projector image 83. The display projector 88 is a short throw projector which is at an acute angle to the substrate 63 which defines a vertical plane typically. The display projector 88 may project and upper light ray 51, a middle light ray 52 and a lower light ray 53. These light rays can be aligned to the upper pocket 31, the middle pocket 32, and the lower pocket 33.

As seen in FIG. 2, the lamp 60 and the LCD 61 can be mounted on a base 64. The display panel 73 can also be mounted to the base 64. The base 64 may have speakers 70 including a first speaker 71 and a second speaker 72. The display panel 73 has a first viewing surface 74 facing toward the lamp 60, and a display panel second viewing surface 75 facing away from the lamp 60. Thus, viewers can view the image on both sides of the display.

As seen in FIG. 3, the display projector 88 min. the display panel 73 and the display panel 73 can have a frameless upper edge 76, a frameless lower edge 79, a frameless right edge 77 and a frameless left edge 78. The display panel first viewing surface 74 thus does not have any frame to it. This can provide a viewing experience where the image appears to be floating in midair.

Figure 4:
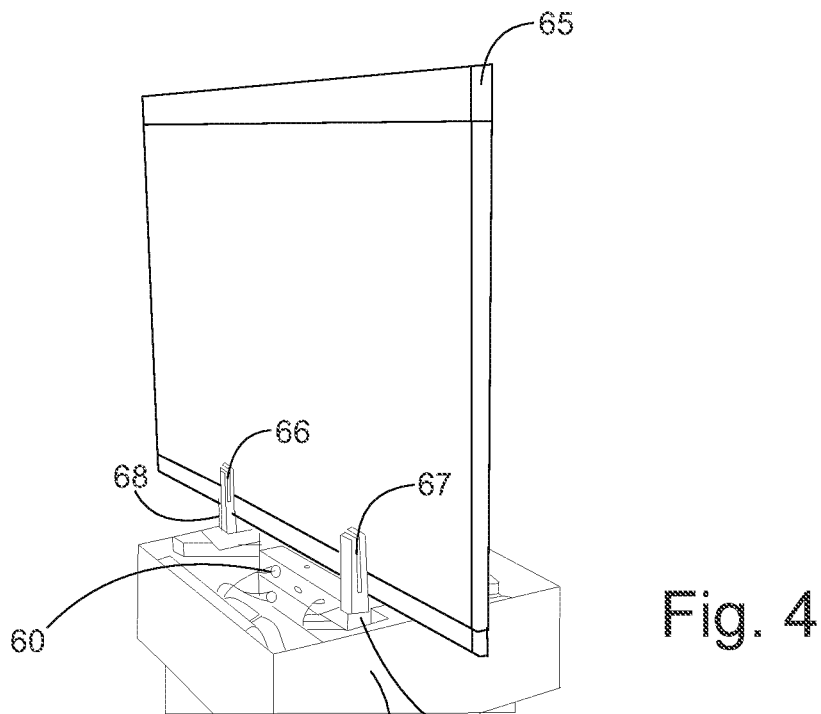
FIG. 4 is a perspective view diagram of the present invention.

As seen in FIG. 4, a larger implementation of the present invention may have a need for a frame. If necessary, a frame 65 for structure can be transparent so that it is not noticed by the viewer. The panel is preferably connected to a first retainer 66 and the second retainer 67 which are anchored to the base 64 at a first retainer anchor 68 and a second retainer anchor 69.

Figure 5:
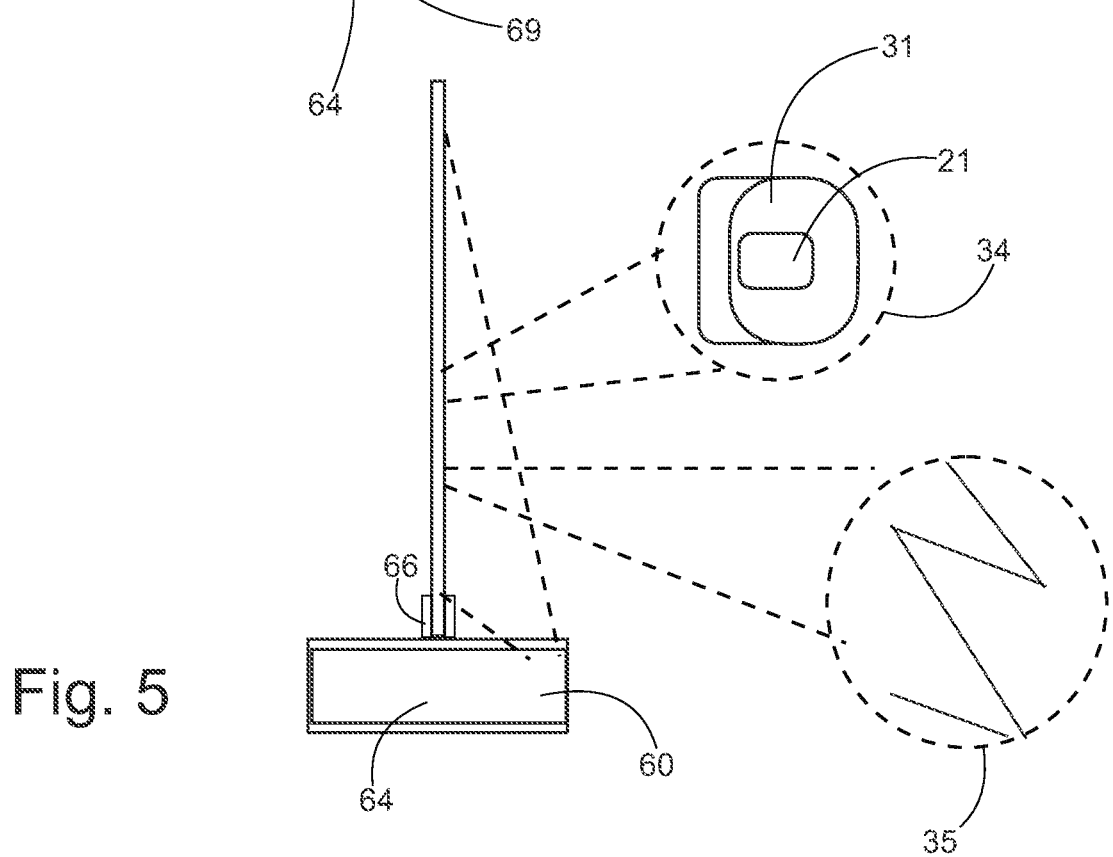
FIG. 5 is a side view diagram of the present invention.

As seen in FIG. 5, the first retainer 66 supports the panel above the base 64 and the base has a lamp 60 which projects upwardly toward the lower region profile 35 and the upper region profile 34. The upper region profile 34 may have an upper pixel 21 with an upper pocket 31.

Figure 6:
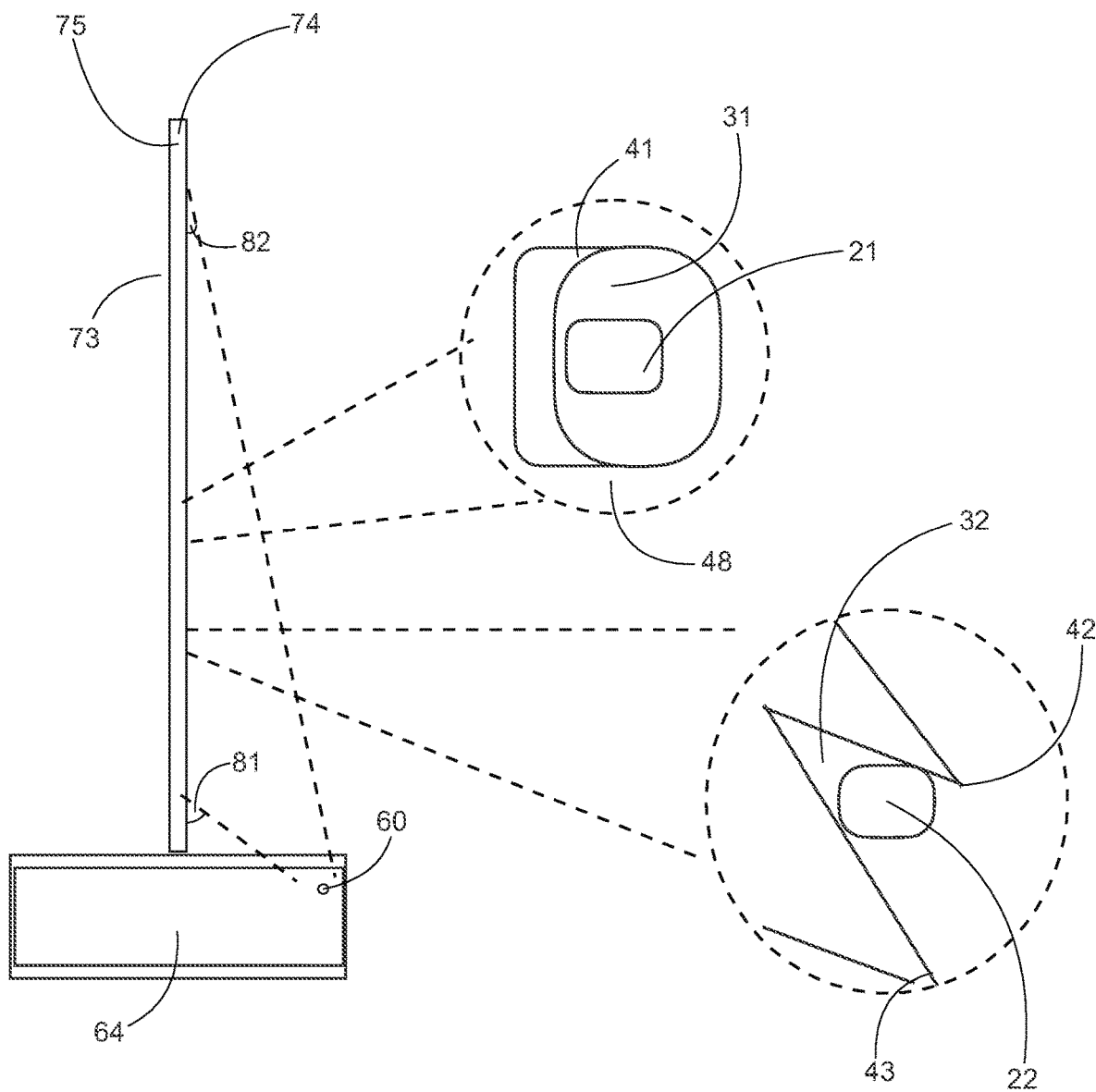
FIG. 6 is another side view diagram of the present invention.

As seen in FIG. 6, the upper pocket 31 and the upper pixel 21 may include an upper tip 41 and an upper middle tip 48. Similarly, the middle pixel 22 can be defined between a middle tip 42 and a lower tip 43 which define a middle pocket 32. The lamp 60 projects at a lower angle 81 which is less acute, and an upper angle 82 which is more acute. The display panel first viewing surface 74 and the display panel second viewing surface 75 of the display panel 73 preferably have equal luminosity.

The invention claimed is:

1. A dual sided display comprising:
    a. a display projector, wherein the display projector comprises a lamp and a display projector image, wherein the display projector image has pixels, wherein the pixels produce light as light rays;
    b. a display panel, wherein the display panel has an upper edge, a lower edge, a left edge and a right edge, wherein the display panel is formed of a substrate that is translucent or transparent;
    c. a display panel first viewing surface formed on the display panel, and a display panel second viewing surface formed on the display panel, wherein the display panel first viewing surface is parallel to and opposing the display panel second viewing surface, wherein the display panel has a thickness; and
    d. a displayed image displayed on the display panel first viewing surface and the display panel second viewing surface simultaneously, wherein the display panel is oriented to the display projector such that the light rays are projected at an acute angle of less than 45 degrees onto at least a portion of the display panel;
    wherein the light rays include an upper light ray, a middle light ray, and a lower light ray, wherein the upper light ray contacts the substrate and reflects from an upper tip into an upper pocket, wherein the middle light ray contacts the substrate and reflects from a middle tip into a middle pocket, wherein the lower light ray contacts the substrate and reflects from a lower tip into a lower pocket, wherein the upper pocket produces an upper pixel of the displayed image, wherein the middle pocket produces a middle pixel of the displayed image, and wherein the lower pocket produces a lower pixel of the displayed image.

2. The dual sided display of claim 1, further including a base, wherein the display projector is mounted to the base, wherein the display panel is mounted to the base.

3. The dual sided display of claim 2, further including a first retainer, wherein the first retainer is mounted to the base and also mounted to the display panel.

4. The dual sided display of claim 1, wherein the upper edge, the lower edge, the left edge, and the right edge are frameless, wherein the display panel has a frameless upper edge, a frameless lower edge, a frameless right edge, and a frameless left edge.

5. The dual sided display of claim 1, wherein the display panel has a display panel surface roughness.

6. The dual sided display of claim 1, wherein the display panel has an upper region and a lower region profile.

7. The dual sided display of claim 1, wherein the display panel has an upper angle that is less than 30 degrees, and a lower angle that is approximately 45 degrees.

* * * * *